United States Patent
Pelz

(10) Patent No.: US 7,324,143 B1
(45) Date of Patent: Jan. 29, 2008

(54) METHOD AND SYSTEM FOR REDUCING NOISE IN A DIGITAL IMAGE AND APPARATUS THEREOF

(75) Inventor: Jeff B. Pelz, Pittsford, NY (US)

(73) Assignee: Rochester Institute of Technology, Rochester, NY (US)

( * ) Notice: Subject to any disclaimer, the term of this patent is extended or adjusted under 35 U.S.C. 154(b) by 0 days.

(21) Appl. No.: 09/545,577

(22) Filed: Apr. 7, 2000

Related U.S. Application Data

(60) Provisional application No. 60/128,931, filed on Apr. 13, 1999.

(51) Int. Cl.
*H04N 5/217* (2006.01)
(52) U.S. Cl. .................................... 348/241
(58) Field of Classification Search .......... 348/222.1, 348/234, 241, 243, 246, 266, 272, 273, 274
See application file for complete search history.

(56) References Cited

U.S. PATENT DOCUMENTS

| | | | |
|---|---|---|---|
| 3,971,065 A | 7/1976 | Bayer | |
| 4,167,754 A | 9/1979 | Nagumo et al. | |
| 4,739,495 A | 4/1988 | Levine | |
| 4,783,753 A | 11/1988 | Crimmins | |
| 4,858,013 A | 8/1989 | Matsuda | |
| 4,910,598 A | 3/1990 | Itakura et al. | |
| 5,036,405 A | 7/1991 | Kojima | |
| 5,047,863 A | 9/1991 | Pape et al. | |
| 5,057,913 A * | 10/1991 | Nagata et al. | 358/302 |
| 5,392,070 A | 2/1995 | Endo et al. | |
| 5,490,094 A | 2/1996 | Heimburger et al. | |
| 5,745,173 A | 4/1998 | Edwards et al. | |
| 5,798,847 A | 8/1998 | Aerts | |
| 5,805,213 A | 9/1998 | Spaulding et al. | |
| 5,828,793 A | 10/1998 | Mann | |
| 5,850,257 A | 12/1998 | Sakata | |
| 5,852,468 A | 12/1998 | Okada | |
| 5,881,178 A | 3/1999 | Tsykalov et al. | |
| 6,111,992 A | 8/2000 | Likhterov et al. | |

OTHER PUBLICATIONS

J. Zheng et al., "Noise Removal from Color Images," *Journal of Intelligent and Robotic Systems*, 7:257-285 (1993).

* cited by examiner

*Primary Examiner*—Vivek Srivastava
*Assistant Examiner*—James M. Hannett
(74) *Attorney, Agent, or Firm*—Nixon Peabody LLP

(57) ABSTRACT

A method for reducing noise in a digital image includes providing a digital image comprising a plurality of channels with each of the channels comprising a set of pixel data signals and applying a filter to each of the sets of pixel data signals, where the filter applied to at least one of the sets of pixel data signals is different from the filter applied to another one of the sets of pixel data signals. An imaging system which reduce noise in a digital image includes an image sensor apparatus and a filter system. The image sensor apparatus captures a digital image comprising a plurality of channels with each of the channels comprising a set of pixel data signals. The filter system comprises at least two different filters with each of the filters filtering at least one of the sets of pixel data signals for one of the channels. The filter applied to at least one of the sets of pixel data signals is different from the filter applied to another one of the sets of pixel data signals.

42 Claims, 13 Drawing Sheets
(10 of 13 Drawing Sheet(s) Filed in Color)

Mask in image memory

 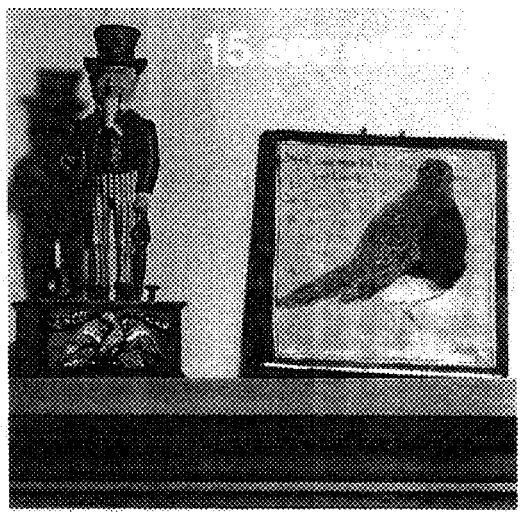
FIG. 6A
FIG. 6B

Lab median filter     Lab masked filter 15 sec capture (Green)  15 sec masked filter (Green)

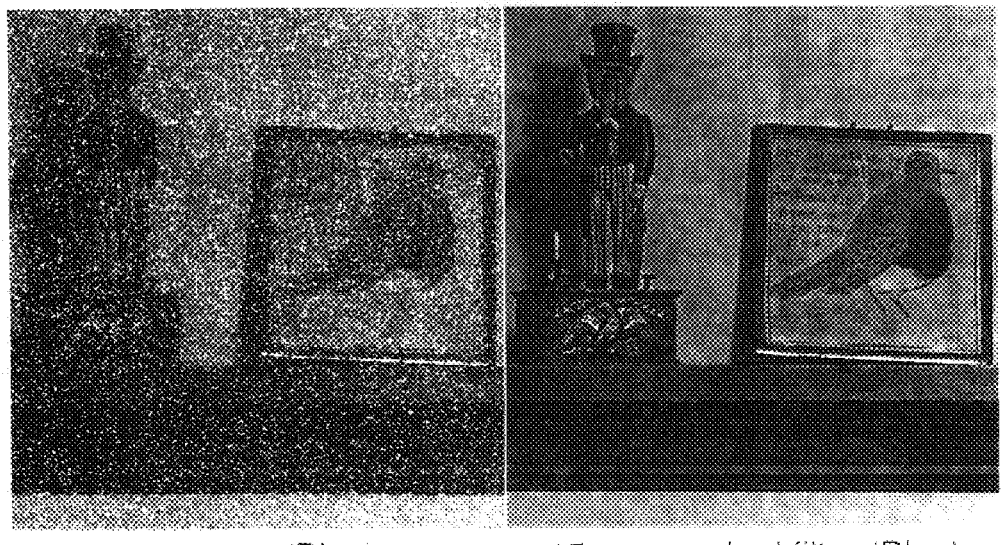
FIG. 10A  15 sec capture (Blue)
FIG. 10B  15 sec masked filter (Blue)

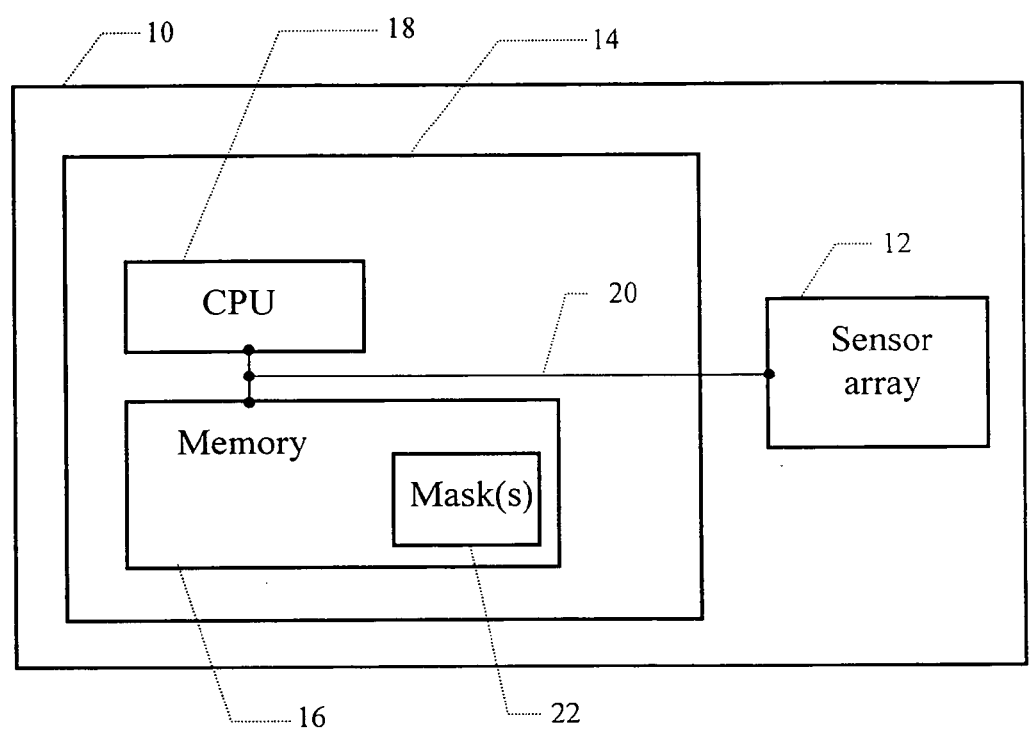
Figure 11a Mask in system memory

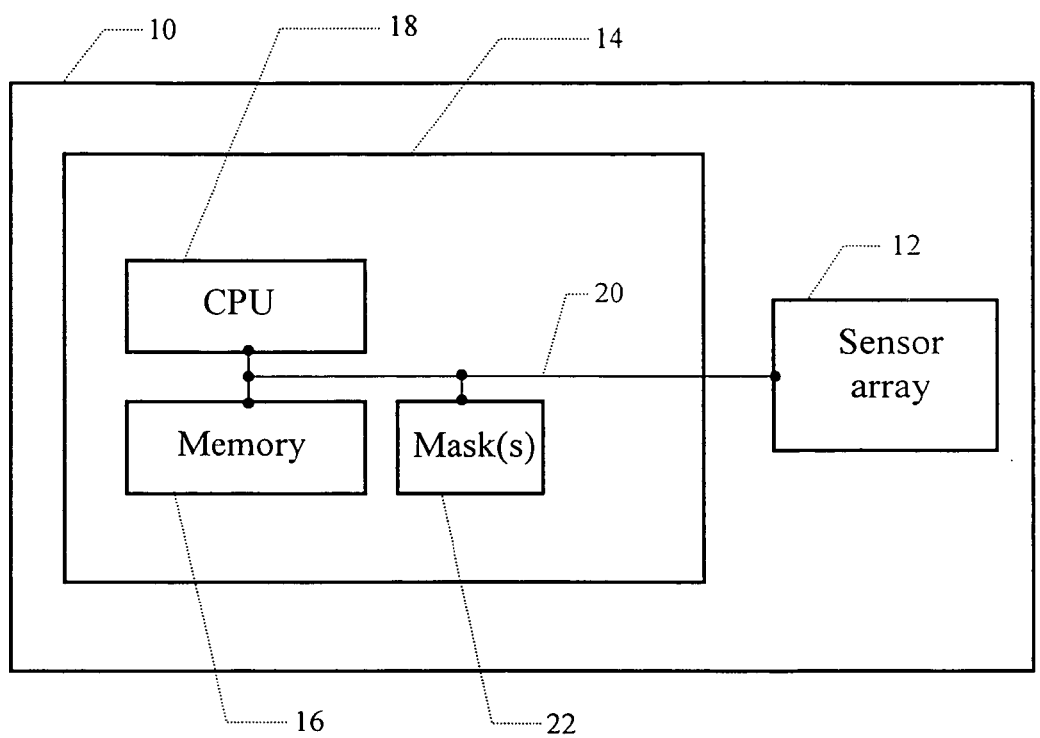
Figure 11b Mask on system bus

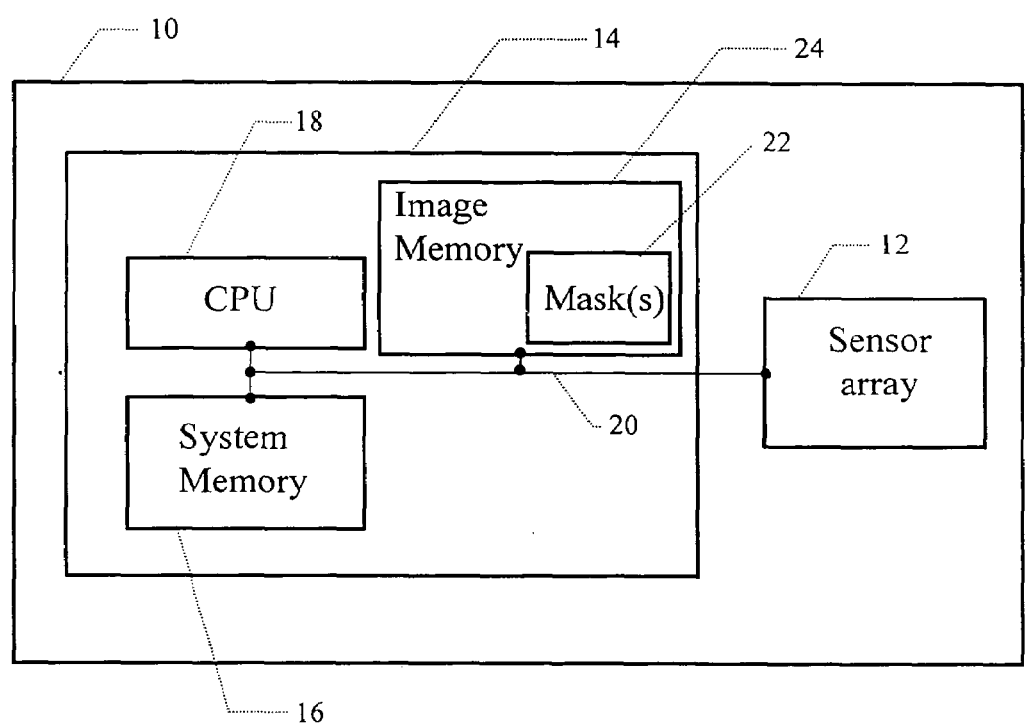
Figure 11c Mask in image memory

METHOD AND SYSTEM FOR REDUCING NOISE IN A DIGITAL IMAGE AND APPARATUS THEREOF

This application claims the benefit of U.S. Provisional Patent Application Ser. No. 60/128,931 filed on Apr. 13, 1999 which is herein incorporated by reference.

FIELD OF THE INVENTION

This invention-relates generally to digital imaging and, more particularly, to a method and system for reducing noise in a digital image.

BACKGROUND OF THE INVENTION

Electronic image sensors, such as charge-coupled devices (CCDs), complementary metal oxide semiconductor (CMOS) sensors, and photodiode arrays, are designed to capture image information by converting a spatially varying electromagnetic exposure to a spatially varying analog and/or digital signal. In an ideal sensor, the final signal is due only to the distribution of electromagnetic (EM) energy collected at the image plane. Real sensors, however, are also susceptible to thermal excitation. The result of the thermal excitation is additive noise—false signal components due to non-image energy within the sensor. All sensors, from the human retina to electronic sensor arrays, suffer from this effect. Signals from electronic sensors are typically amplified, exacerbating the effect.

Referring to FIG. 1, a thirty second exposure captured on a CCD sensor in a Kodak Professional DCS 315 digital-camera is illustrated. The additive noise in this digital image is clearly visible. It is also evident that the noise is not equally distributed in spectral content.

While thermal excitation in the sensor array and subsequent processing are responsible for the additive noise, the final effect is due to several interacting influences. Because of image sensors' varying sensitivity to different wavelength bands, system designs often include differential gain for each channel, leading to more severe noise characteristics in the channels with higher gain. Many color sensors have color filter arrays overlaying the sensor surface. These arrays often have different spatial sampling frequencies in the different color planes; the sampling density is typically highest in the green to optimize luminance-based resolution. One example of this is disclosed in U.S. Pat. No. 3,971,065, which is hereby incorporated by reference.

The additive noise varies with several variables, notably sensor temperature, exposure duration, and gain. As the sensor temperature is raised, thermal excitation within the sensor increases, leading to more pronounced noise levels. The duration of the exposure also plays an important role in the degree to which noise degrades image quality.

Referring to FIGS. 2A-2F, the central region from a sequence of exposures ranging from 1 through 30 seconds is shown (the camera aperture was changed to maintain equal exposures throughout the sequence). The effect of thermal noise on images captured with electronic sensors places practical limits on exposure duration without cooling. Current digital cameras restrict the exposure duration and/or caution users that long exposures may lead to a degradation of image quality. By way of example, the users guide for the Kodak DCS-315 digital camera warns that exposure durations greater than 0.25 seconds will lead to reduced image quality.

Noise in the final image is also a function of detector sensitivity and gain. Increasing the effective sensitivity of a system by, for example, increasing system gain, generally leads to increased noise. The resultant noise levels limit the practical sensitivity of modern digital cameras. Increasing the sensitivity has commercial value because the cameras can be used in lower illumination levels and/or with shorter exposure times without electronic flash and the maximum distance at which a given flash is effective is increased. A technique for reducing apparent noise in digital imaging systems would enhance the value of digital camera systems and speed their acceptance for applications ranging from consumer photography to forensic imaging (for example).

Another variable affecting the noise characteristics in a digital imaging system is the sensor array itself. Specific pixels are subject to varying degrees of noise due to thermal and amplification variations. This characteristic is unlike detecting 'bad pixels' (or 'dark pixels' or other term) which vary in sensitivity. One example of an apparatus for correcting faulty pixel signals by replacing the faulty pixel signals with normal pixel signals is disclosed in U.S. Pat. No. 5,392,070, which is hereby incorporated by reference. Methods have also been described to correct for pixels' fixed offset such as in U.S. Pat. No. 4,739,495, which is hereby incorporated by reference.

Pixels referred to in this invention are working sensor elements, and contribute fully to exposures made at relatively short exposures and/or processed at low amplification levels. They differ from the plurality of pixels by their susceptibility to noise.

The traditional approach to reducing the effects of additive noise in digital images is the image processing technique known as median filtering. One example of median filtering is disclosed in U.S. Pat. No. 4,783,753, which is hereby incorporated by reference. Such filtering techniques have also been applied to noise due to dust and scratches in images as disclosed, by way of example, in U.S. Pat. No. 5,036,405, which is hereby incorporated by reference.

Other systems have been devised to reduce noise in systems by affecting different pixels differently, such as in U.S. Pat. No. 4,858,013, which is hereby incorporated by reference, but none of these systems make use of information regarding pixels' fixed susceptibility to noise. The success of the system described here is due to the filtering method, as well as the identification and mapping of image elements based on their noise susceptibility under varying exposure/processing conditions. The median filter operation replaces each pixel with the median value of the pixels that surround a particular pixel within a specified radius. The traditional median filtering technique also applies the same filter to every pixel in the red, green, and blue channels.

Unfortunately, the three-color sensors have different noise characteristics in each channel. This occurs for several reasons, chiefly because of the non-uniform spectral sensitivity and the effect of the subtractive filter array. Because the three channels have different characteristics, the optimum median filter for each channel is not likely to be the same for each channel.

Referring to FIGS. 3A-3D, the effect of median filtering the fifteen second exposure shown in FIG. 2E is shown. While it is evident that median filtering with progressively larger radii is effective in reducing additive noise, this approach also degrades image quality to a degree that makes the image unacceptable.

SUMMARY OF THE INVENTION

A method in accordance with one embodiment of the present invention for reducing noise in a digital image includes providing a digital image comprising a plurality of channels with each of the channels comprising a set of pixel data signals and applying a filter to each of the sets of pixel data signals, where the filter applied to at least one of the sets of pixel data signals is different from the filter applied to another one of the sets of pixel data signals.

A method in accordance with another embodiment of the present invention for reducing noise in a digital image includes a few steps. A digital image comprising red, green, and blue channels is provided. Next, the red, green, and blue channels are transformed to an achromatic channel and two chrominance channels, where the achromatic channel and the two chrominance channels each comprise a set of pixel data signals. Next, a filter is applied to each of the sets of pixel data signals, where the filter applied to at least one of the sets of pixel data signals is different from the filter applied to another one of the sets of pixel data signals.

A method in accordance with another embodiment of the present invention for reducing noise in a digital image includes a few steps. A digital image comprising a plurality of channels with each of the channels comprising a set of pixel data signals is provided. Next, the pixel data signals in each set of pixel data signals with at least a first characteristic are identified. Next, a filter is applied to the identified pixel data signals in each of the sets of pixel data signals.

An imaging system in accordance with another embodiment of the present invention includes an image sensing device and a filter system. The image sensing device captures a digital image comprising a plurality of channels with each of the channels comprising a set of pixel data signals. The filter system comprises at least two different filters. Each of the filters at least one of the sets of pixel data signals for one of the channels.

An imaging system in accordance with another embodiment of the present invention includes an image sensing device, a transformation system, and a filter system. The image sensing device captures a digital image comprising red, green, and blue channels. The transformation system transforms the red, green, and blue channels to an achromatic channel and two chrominance channels. The achromatic channel and the two chrominance channels each comprise a set of pixel data signals. The filter system comprises at least two different filters. Each of the filters filtering at least one of the sets of pixel data signals for one of the achromatic or chrominance channels.

An imaging system in accordance with another embodiment of the present invention includes an image sensing device, a masking system, and a filter system. The image sensing device captures a digital image comprising a plurality of channels with each of the channels comprising a set of pixel data signals. The masking system specifies the pixel data signals in each set of pixel data signals with at least a first characteristic. The filter system applying a filter to the identified pixel data signals in each of the sets of pixel data signals. In this embodiment, the mask identifies the pixels susceptible to noise at a given exposure, a range of exposures, an amplification value, or a range of amplification values. When masked before channel-specific filtering is applied, noise is reduced without adverse effects on the unmasked pixels, typically comprising a majority of pixels in each channel.

The present invention provides a number of advantages including reducing noise in images captured with digital cameras. More specifically, the present invention significantly reduces noise through an adaptive filtering technique which adjusts or customizes the filter for each channel of the image. The present invention is able to further improve the quality of the image by applying a color-space transformation before the filtering operation. The transformations allow important optimizations in the filtering process. The present invention is able to further improve the quality of the image by making a list (or an equivalent pixel map) of the pixels most susceptible to noise at a given level of exposure duration and amplification and then limiting the noise reduction or filtering processing to identified pixels on the list. By reducing noise in the images with the present invention, longer exposure times and increased sensitivity with digital cameras are possible. As a result, digital cameras will gain greater acceptance because of the higher image quality in a wide range of applications.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIGS. 6A-6B are digital images median filtered in CIELAB color space without a noise mask and with a noise mask in accordance with the present invention;

FIG. 10A is a digital image in a blue channel without any filtering;

FIG. 10B is a digital image in a blue channel with a masking filter in accordance with the present invention; and FIGS. 11A-11C are imaging systems in accordance with the present invention.

DETAILED DESCRIPTION

Figure 1:
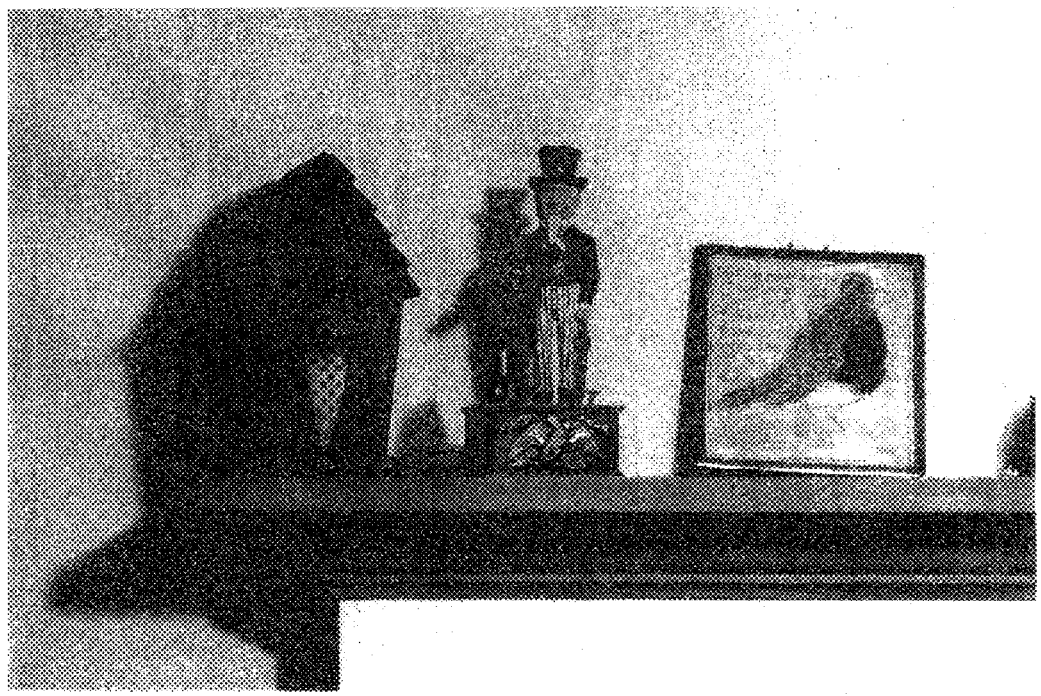
FIG. 1 is a digital image using a thirty second exposure captured on a CCD sensor in a Kodak Professional DCS 315 digital camera.

Imaging systems 10 for reducing noise in a digital image in accordance with the present invention are illustrated in FIGS. 11A-11C. A method for reducing noise in a digital image in accordance with another embodiment of the present invention includes providing a digital image comprising a plurality of channels with each of the channels comprising a set of pixel data signals and applying a filter to each of the sets of pixel data signals, where the filter applied to at least one of the sets of pixel data signals is different from the filter applied to another one of the sets of pixel data signals. The imaging system 10 which reduces noise in a digital image includes an image sensing device 12 and an image processing system 14. The system and method for reducing noise in a digital image provide a number of advantages including reducing noise in images captured with digital cameras.

Referring to FIGS. 11A-11C, the imaging system 10 includes an image sensing device 12 which captures the image. A variety of different types of image sensing devices 12 can be used, such as charge coupled devices, complementary metal oxide semiconductor sensors, and photodiode arrays, by way of example only. Typically, the image sensing device 12 will have a plurality of picture elements which sample the incident power or energy. The sampled values can them be transduced to an analog and/or digital signal suitable for processing, storage, or transmission. Once the image is captured by the image sensing device 12, the pixel data signals are transferred out to a memory 16 for storage and/or to an image processing system 14 for further processing.

In this particular embodiment, the image processing system 14 includes a central processing unit (CPU) 18 coupled to the memory 16 via a bus 20 which is coupled to the image sensing device 12, although the image processing system 14 may comprise other components as is well known to those of ordinary skill in the art. The memory 16 may be programmed with computer readable code to be executed by the CPU 18 to carry out the methods described in greater detail below. As shown in FIG. 11C, the imaging system 10 may also include a system memory 16 and an image memory 24.

In this particular embodiment, the imaging system 10 includes a mask 22. The mask 22 can be defined at time of manufacture, as part of an inspection/quality assurance system, closer to point-of-sale, or can be generated from image statistics gathered during consumer use. In the latter case, the system could self-generate a mask 22 by monitoring individual pixel values across images, locating pixels that could be filtered, and the conditions under which they should be filtered. While this implementation could under some conditions produce results not as effective as pre-programmed masks, the implementation allows a lower cost system that could be implemented in consumer-grade cameras without adding significantly to the manufacturing and associated costs.

Regardless of the manner in which the mask 22 is generated, it can be stored in memory 16, such as in a RAM, ROM, EPROM, EEPROM, or flash memory, or it could be incorporated in a signal-processing system associated with image capture/transfer.

The invention can be implemented as part of hardware design, as system software, as part of software used to transfer images from camera (or image memory), as stand-alone or 'plug-in' software, or in drivers (e.g. TWAIN).

The mask or masks 22 can be stored in a number of ways; for example as lists, as binary image maps, or encoded in a manner to minimize storage requirements. In another possible method, the masks 22 could be stored in the memory 16 normally assigned to, or useful for, image memory. A standard color image in memory 16 comprises three color planes, typically eight bits/plane. One implementation of the invention would place grayscale masks 22 in each of the planes. The masks 22 could be assigned to three image channels. The channels could be RGB, luminance/chrominance (e.g., CIELAB), or other representation. Each mask 22 would comprise of a grayscale image, with the digital value at each pixel encoded to indicate over what exposure/processing conditions the pixel should be filtered. For example, a pixel value of 255 in the first mask channel could indicate that the images luminance value at that pixel should be filtered at any exposure greater than 0.25 seconds, while a pixel value of 128 would indicate that the pixel should only be filtered at exposures greater than 5 seconds, etc.

In this particular embodiment, the image processing system 14 is programmed with a filtering process which customizes the filter for the pixel data signals for each channel, e.g. red, green, and blue channels or achromatic (luminance) and two chromatic (chrominance) channels, for the image, although the imaging system 10 can use other types of filtering processes or device. Since filtering processes and devices are well known to those of ordinary skill in the art, they will not be discussed in detail here. In this particular embodiment, the filters are red, green, and blue median filters, although other types of filters could be used. The median filter for the red channel replaces the pixel data signal in each filtered pixel with the median value of the pixel data signals in the pixels within a first set distance or radius of the filtered pixel, such as a radius of two pixels. The median filter for the green channel replaces the pixel data signal in each filtered pixel with the median value of the pixel data signals in the pixels within a second set distance or radius of the filtered pixel, such as a radius of one pixel. The median filter for the blue channel replaces the pixel data signal in each filtered pixel with the median value of the pixel data signals in the pixels within a set distance or radius the filtered pixel, such as a radius of three pixels. Although one type of filter processing is carried out by the image processing system 14 in this particular embodiment, other processes or devices for filtering can also be used, such as a filter wheel.

The imaging processing system 14 may also be programmed to convert the pixel data signals for red, green, and blue channels to an achromatic (luminance) and to chromatic (chrominance) channels. Since transformation techniques and systems are well know to those of ordinary skill in the art, they will not be discussed in detail here. The above-described transformation allows for important optimizations in the filtering process resulting in higher image quality.

The image processing system 14 may also be programmed with a masking process which restricts application of the filters to pixels which have at least one characteristic or factor. Since mapping and masking processes in imaging are well known to those of ordinary skill in the art, they will not be described in detail here. By way of example only, in this particular embodiment the characteristic or factor may be noise above a set threshold level. A map of pixels which are susceptible to noise and/or some other factor may be stored in memory 16 in the image processing system 14 and can be used to mask application of the filter to certain identified pixels. Although the masking processing is carried out by the image processing system 14 in this particular embodiment, other processes or devices for masking can also be used. The operation of the present invention will be described with reference to the following examples discussed below.

Referring to FIGS. 4A-4D, examples of applying median filters with the imaging system which have been customized for the red, green, and blue channels independently in accordance with one embodiment of the present invention are illustrated. In these examples, the images are labeled with the radii of the median filter for each channel applied by the imaging system 10, e.g., "R:2 G:1 B:3"indicates that the red channel was filtered with a radius of two pixels, the green channel with a radius of one pixel, and the blue channel with a radius of three pixels. As these examples illustrate; the present invention dramatically reduces the apparent degradation due to noise in the image, while suffering less degradation of the image than the median filtering shown in FIGS. 3A-3D. In this particular embodiment, the filters are median filters which are implemented with the image processing system 14 in accordance with preprogrammed instructions in which each filtered pixel data signal in each pixel is replaced by the median value of the pixel data signals within a set radius from the filtered pixel data signal customized for each color channel, although other filtering processes and/or systems could be used.

By adjusting and applying the median filters independently in each image channel in the imaging system, each filter can be customized to that image plane, eliminating the need to over-filter some planes and/or leaving objectionable artifacts in other planes. The customized filtering used by the imaging system 10 can be adjusted as needed. For example, the filtering executed by the imaging system 10 can be predetermined and stored in memory 16 for use on every image, can be selected from a pre-defined lookup table which is stored in memory 16 based on some particular factor or factors, such as exposure duration and/or scene statistics, or can be customized each time based on an analysis of each captured image. The filtering operation can be applied by the imaging system 10 at the time of the exposure to the image sensing device 12 or at a later time.

While customizing and applying the filters to the red, green, and blue channels independently significantly increases the subjective image quality, further improvements are possible by applying color-space transformations before the filtering operation by the imaging system 10. The method disclosed here and programmed into the memory 16 for execution by the CPU 18 converts the pixel data signals from red, green and blue channels to an achromatic (luminance) and >two chromatic (chrominance) channels before filtering. The transformations allow important optimizations in the filtering process. The subjective percept of 'sharpness' is based largely on the high-frequency luminance information in an image, so minimizing filtering in that channel maximizes subjective image quality. More aggressive filtering by the imaging system 10 is then possible in the chrominance channels with less reduction in subjective image quality.

Figures 2A, 2B, 2C, 2D, 2E, 2F:
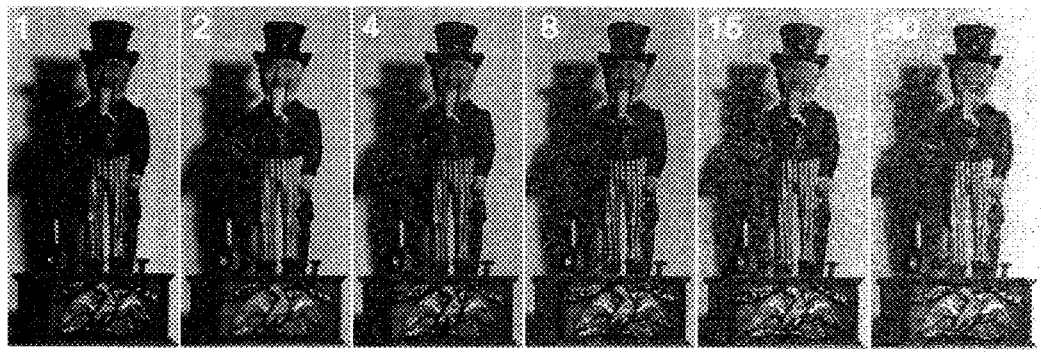
FIGS. 2A-2F are digital images of the central region of FIG. 1 from a sequence of exposures of one second, two seconds, four seconds, eight seconds, fifteen seconds, and thirty seconds (the camera aperture was changed to maintain equal exposures throughout the sequence)
Figures 3A, 3B, 3C, 3D:
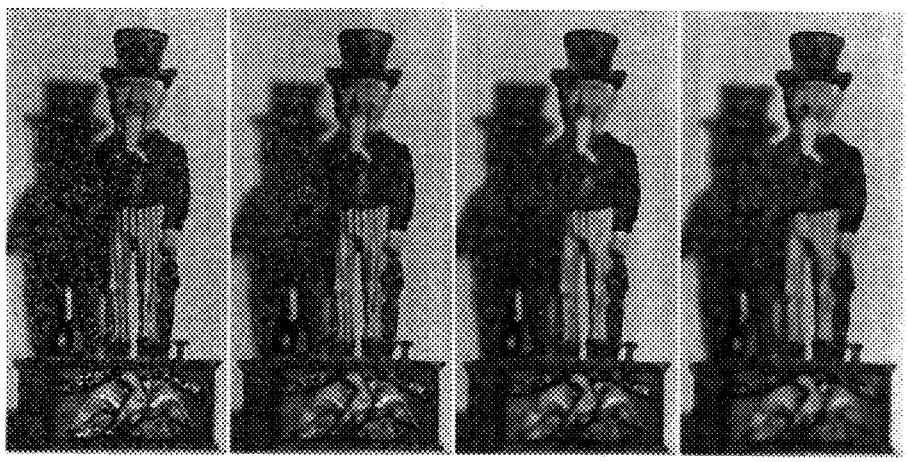
FIG. 3A-3D are digital images of the fifteen second exposure shown in FIG. 2E with median filtering with progressively larger radii, but the same radius for each channel.
Figures 4A, 4B, 4C, 4D:
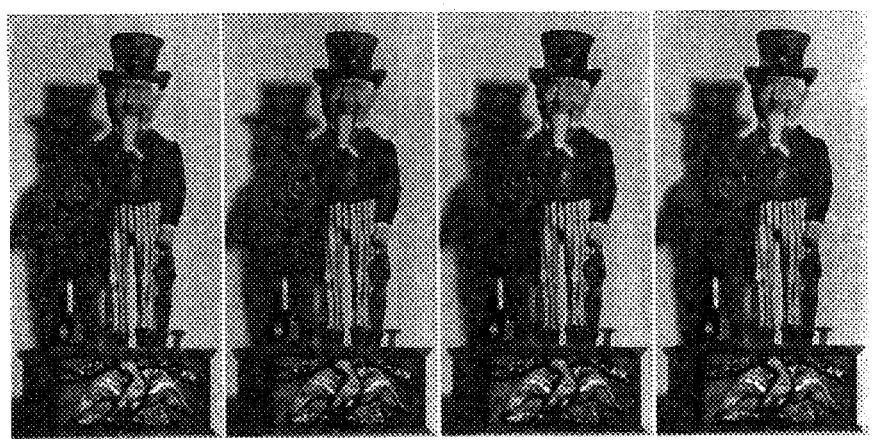
FIGS. 4A-4D are digital images of the fifteen second exposure shown in FIG. 2E with median filters with different radii applied to the red, green, and blue channels in accordance with the present invention.
Figures 5A, 5B, 5C, 5D:
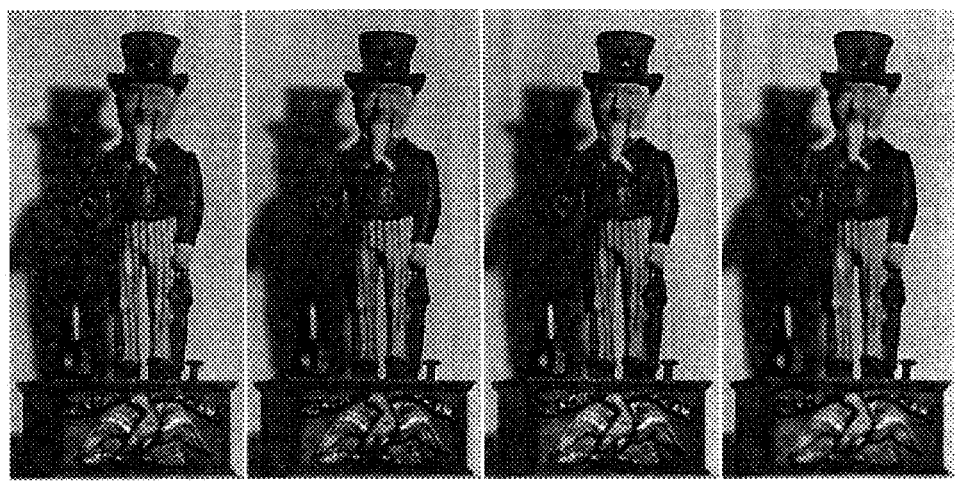
FIGS. 5A-5D are digital images of the fifteen second exposure shown in FIG. 2E with a series of filters with different radii applied in CIELAB color space ("Lab") in accordance with the present invention.

Referring to FIGS. 5A-5D, the fifteen second exposure from FIG. 2E with a series of filters applied in CIELAB space i.e. the achromatic (luminance) and the two chromatic (chrominance) channels) are illustrated. The image labels below these figures indicate the radii of the median filter which have been customized for each channel in CIELAB space and then applied to the luminance and chrominance channels. Again in this particular embodiment, the filters are median filters which are implemented with the image processing system 10 in accordance with preprogrammed instructions in which, each filtered pixel data signal in each pixel is replaced by the median value of the pixel data signals within a set radius from the filtered pixel data signal customized for each channel, although other filtering processes and/or systems could be used. The processed images which have been transformed to CIELAB space show a further reduction in image noise while maintaining the apparent image sharpness of the original.

While the described process of median filtering in a luminance/chrominance color space is able to reduce image noise with relatively few artifacts, it is possible to further reduce the artifacts by restricting the filtering process to pixels identified as likely to be influenced by additive noise. The method disclosed here and programmed into the memory 16 for execution by the CPU 18 in the image processing system 14 identifies which pixels are to be filtered in each of the channels and then masks or restricts the unidentified pixels from filtering. This extension allows image noise to be reduced while limiting the artifacts of the filtering process.

What the present invention has recognized is that while the bulk of the noise in digital systems is due to thermal noise in the image sensing device 12 or sensor during image capture (which is essentially a random process), it is evident that the image locations where the noise is most severe varies between image sensors but is relatively consistent across exposures. These variations are due to many factors, including variability in the microelectronic fabrication process of the chip used in the image sensing device 12 from silicon substrate manufacture through packaging. The noise is due to a stochastic process within each pixel, so the exact digital count at a pixel due to noise cannot be reliably predicted for any given exposure. However, individual pixels can be identified that are more susceptible to noise than other pixels. The noise characteristics of individual cameras or imaging systems 10 are relatively stable over time. By way of example only, the noise characteristics of one digital camera were monitored over a period of six months, and no significant variation was detected.

Accordingly, by making a list (or an equivalent pixel map) of the pixels most susceptible to one or more factors, such as noise above a threshold level, and storing it in memory 16 for use to restrict application of the filters to pixel data signals from certain pixels it is possible to limit noise reduction processing or filtering to identified pixels on the list. The result is that any artifacts of filtering remaining in the disclosed process are limited to the specific, limited regions of the image in which noise has been determined to be a problem. A variety of different method and system for mapping or identifying pixels to filter and those which are to be masked or restricted from filtering can be programmed into the memory 16 for execution by the CPU 18. By way of example, in a simple implementation the set of identified or 'noisy' pixels can include, for example, all pixel locations in the image that suffer from noise in a dark exposure of a given duration or it could include individual lists for each image channel (RGB or Lab, for example). The former would allow faster processing; the latter optimum image quality with minimal artifacts. Further reductions in artifacts are possible by for example identifying a different set of pixels for processing for each exposure duration (or for a range of exposures). Note that multiple lists could be maintained individually or the ensemble could be stored in memory 16 as a multi-level image by encoding the different exposure durations as different pixel counts.

Such a technique would include a three-channel image (in RGB, Lab, or other color space), in which the digital count within each image represented an image filtration map for any exposure duration. By way of example only, the values in the L* channel would encode the image sensing device's 12 or sensor's noise characteristics in the luminance channel. Image locations with value [0] would represent image locations that should not be filtered by the imaging system 10 because they have been shown to be least susceptible to noise even at very long exposure durations. These image regions could not suffer from any artifacts because they would not be altered by the filter. Image locations with value [1] could indicate pixels that are likely to suffer from substantial thermal noise in exposure durations over 30 seconds (for example). At very long exposures, these pixels (in this channel) would be filtered by the imaging system 10 and at shorter exposures they would not be filtered by the imaging system 10, and therefore would be protected against potential artifacts. Larger values in the image encode regions that suffer progressively more from thermal noise and would be included in shorter and shorter exposure durations. Note that this scheme would automatically correct for isolated defective pixels in the image that introduce noise in the image even at relatively short exposures.

The process could be easily extended to include pixels that produce values below optimum levels. Such pixels do not suffer from thermal noise; but rather they are less sensitive than surrounding pixels and result in dark (or black) pixels in the final image. One example of an apparatus for detecting inoperative pixels is disclosed in U.S. Pat. No. 5,047,863, which is hereby incorporated by reference. Implementing a noise image including both noisy and dark pixels would allow manufacturers to use sensor chips for the image sensing device 12 that would otherwise fail quality control testing. Note that such an image could be compact because of the limited number of values that have to be stored. For example, an 8-bit image could encode all three channels by encoding two channel's noise maps in the bits 1-3 and 4-6, and the remaining channel's map in the remaining two bits. This scheme would allow 8, 8, and 4 different exposure durations for the three channels. A 16-bit image could be split (6, 6, 5), to allow 64, 32, and 32 levels. A more complete mapping of a camera's noise characteristics could be stored in a traditional 24-bit image allowing 256 exposure durations in each of the three channels. Further savings could be achieved by standard image compression schemes; because most of the image include relatively large regions with [0] values, compression would yield significant storage reduction.

Referring to FIG. 6A, a resulting image from the imaging system 10 which used an Lab median noise filter without a noise mask is illustrated. Referring to FIG. 6B, the same image resulting from the imaging system 10 which used an Lab median noise filter with a noise mask is illustrated. As these images illustrate there is a noticeable improvement in the resulting image when a masking process is implemented to restrict application of the filters to identified pixels.

Figure 7A:
FIGS. 7A-7B are digital images of the fifteen second exposure shown in FIG. 2E with Lab median noise filter without a noise mask and with a noise mask in accordance with the present invention.
Figure 7B:

It is evident that the noise reduction in a masked image is at least equal to that processed without the mask, while the artifacts of filtering are reduced to nearly undetectable levels. FIG. 7A shows the fifteen second image shown in FIG. 2E after the whole image has been filtered in Lab color space, but without a masking process or system. While there are not severe artifacts, some reduction in apparent sharpness is visible in fine image details. By way of example only, look at the detail in the eagle's wings and the star on the hat in FIG. 7A. FIG. 7B shows the image shown in FIG. 2E after filtering in Lab color space and masking by the imaging system 10. In this particular example, filtering was accomplished in the imaging system 10 with a radius of two pixels in the L channel, four pixels in the a chrominance channel, and six pixels in the b chrominance channel and a mask was used to restrict filtering to pixels identified as likely to generate noise in the image. As this example illustrates image quality is improved with the mask.

Figures 8A, 8B:
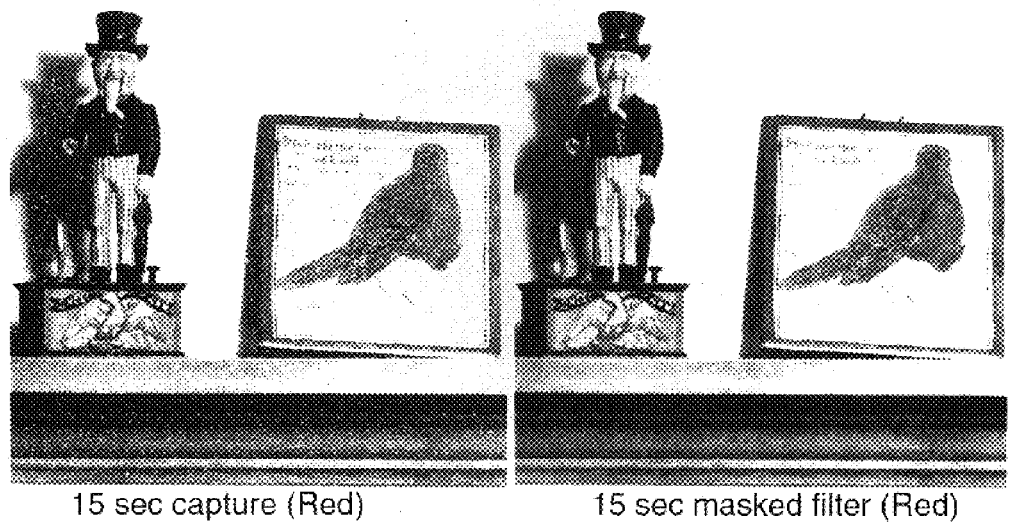
FIG. 8A is a digital image in a red channel without any filtering.
FIG. 8B is a digital image in a red channel with a masking filter in accordance with the present invention.
Figure 9A:
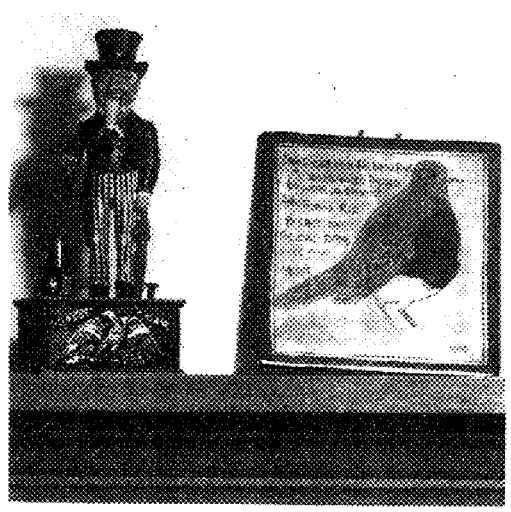
FIG. 9A is a digital image in a green channel without any filtering.
Figure 9B:
FIG. 9B is a digital image in a green channel with a masking filter in, accordance with the present invention.

Referring to FIGS. 8A, 9A, and 10A, images captured by an imaging system without the present invention in the red, green, and blue channels, respectively, are illustrated. Referring to FIGS. 8B, 9B, and 10B, images captured with an imaging system with a masked filtering process or system in accordance with one embodiment of the present invention in the red, green, and blue channels, respectively, are illustrated. Enhanced image quality is evident in FIGS. 8B, 9B, and 10B, but the improvement in the blue channel shown in FIG. 10B is the most dramatic in this particular embodiment. This particular example demonstrates the utility of transforming the image to a luminance/chrominance color space in the imaging system 10 before filtering. The mask/filter technique can be applied directly to RGB image planes to limiting filtering artifacts, but noise reduction is less dramatic.

The demonstrated advantages of performing the filtering in Lab color space in the imaging system 10 is due to the initial transformation from RGB to XYZ tristimulus values, and doesn't require the following non-linear transform from tristimulus space to Lab. As a result, substantial computational savings can be realized by programming the imaging system 10, in one particular embodiment, to implement the following: RGB→XYZ (or other color space): median filter: →RGB.

The imaging system 10 can also be programmed or implemented to work with the raw CCD/CMOS capture, before color interpolation has been completed. This may produce significant gains because noise in the raw image is spread during the interpolation step.

Accordingly, the present invention limits the apparent noise in images made with digital cameras and other imaging systems 10 of any type. The benefits of the present invention are most evident in situations requiring extended exposure times or enhanced sensitivity, such as scientific and forensic imaging or any case where it is desirable to capture images with limited illumination and/or restricted apertures. Image quality which previously could only be found in film-based cameras, can now be found in digital cameras which use the present invention. The present invention can be implemented in and used in a variety of different systems, such as those spanning the range from low-cost 'point-and-shoot' cameras priced under $400 to high-end six megapixel systems costing over $20,000. Dramatic reduction in noise with minimal artifacts has been demonstrated in all cases with the present invention.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A method for reducing noise in a digital image, the method comprising:
    providing the digital image, the digital image comprising a plurality of channels with each of the channels comprising a set of pixel data signals;
    selecting a different filter for each of the sets of pixel data signals based on at least exposure duration and one or more scene statistics for the provided digital image;
    applying each of the different selected filters to a different one of the sets of pixel data signals;
    providing a grayscale mask for each of the sets of pixel data signals;
    restricting the application of the filters to one or more of the pixel data signals in each of the sets of pixel data signals based on the provided grayscale mask.

2. The method as set forth in claim 1 wherein the plurality of channels comprises a red channel, a green channel, and a blue channel.

3. The method as set forth in claim 1 further comprising applying a color-space transformation to the sets of pixel data signals before the applying each of the different adjusted filters.

4. The method as set forth in claim 1 wherein each of the grayscale masks has one of a range of threshold values for an exposure condition for each of the pixel data signals that indicates when each of the pixel data signals should be filtered.

5. The method as set forth in claim 1 further comprising:
    identifying the pixel data signals in each set of pixel data signals with at least a first characteristic; and
    restricting the application of the filters to the unidentified pixel data signals in each set of pixel data signals.

6. The method as set forth in claim 5 wherein the first characteristic is noise at or above a first threshold level.

7. The method as set forth in claim 1 wherein each of the different adjusted filters is a median filter and the applying each of the different adjusted filters further comprises replacing each individual pixel data signal within the set of pixel data signals with a median pixel data signal derived from a median value of adjacent pixel data signals within a set radius around the individual pixel data signal.

8. The method as set forth in claim 7 wherein the set radius is different for the different filters.

9. The method as set forth in claim 7 further comprising adjusting the set radius of pixel data signals in the filter for each of the channels of the digital image based on at least one factor.

10. The method as set forth in claim 9 wherein the factor comprises a duration of exposure for capturing the digital image.

11. A method for reducing noise in a digital image comprising:
    providing the digital image comprising red, green, and blue channels;
    transforming the red, green, and blue channels to an achromatic channel and two chrominance channels, wherein the achromatic channel and the two chrominance channels each comprise a set of pixel data signals;
    selecting a different filter for each of the transformed sets of pixel data signals based at least on exposure duration and one or more scene statistics for the provided digital image;
    applying each of the different selected filters to a different one of the transformed sets of pixel data signals;
    providing a grayscale mask for each of the sets of pixel data signals; and
    restricting the application of the filters to one or more of the pixel data signals in each of the sets of pixel data signals based on the provided grayscale mask.

12. The method as set forth in claim 11 wherein each of the grayscale masks has one of a range of threshold values for an exposure condition for each of the pixel data signals that indicates when each of the pixel data signals should be filtered.

13. The method as set forth in claim 11 wherein the applying further comprises applying a different filter to each of the transformed sets of pixel data signals.

14. The method as set forth in claim 11 further comprising:
    identifying the pixel data signals in each set of pixel data signals with at least a first characteristic; and
    restricting the application of the filters to the unidentified pixel data signals in each set of pixel data signals.

15. The method as set forth in claim 14 wherein the first characteristic is noise at or above a first threshold level.

16. The method as set forth in claim 11 wherein each of the different adjusted filters is a median filter and the applying each of the different adjusted filters further comprises replacing each individual pixel data signal within the set of pixel data signals with a median pixel data signal derived from a median value of adjacent pixel data signals within a set radius around the individual pixel data signal.

17. The method as set forth in claim 16 wherein the set radius is different for the different filters.

18. The method as set forth in claim 16 further comprising adjusting the set radius of pixel data signals in the filter for each of the channels of the digital image based on at least one factor.

19. The method as set forth in claim 18 wherein the factor comprises a duration of exposure for capturing the digital image.

20. A method for reducing noise in a digital image, the method comprising:
    providing the digital image, the digital image comprising a plurality of channels with each of the channels comprising a set of pixel data signals;
    providing a grayscale mask for each of the sets of pixel data signals, each of the grayscale masks has one of a range of threshold values for an exposure condition for each of the pixel data signals that indicates when each of the pixel data signals should be filtered
    selecting a different median filter for each of the sets of pixel data signals based on at least exposure duration and one or more scene statistics for the provided digital image; and
    applying each of the different median filters to a different one of the sets of pixel data signals, wherein the application of the filters to one or more of the pixel data signals in each of the sets of pixel data signals is based on the threshold values for each of the pixel data signals provided by the grayscale mask.

21. The method as set forth in claim 20 wherein the plurality of channels comprises a red channel, a green channel, and a blue channel.

22. The method as set forth in claim 20 further comprising applying a color-space transformation to the sets of pixel data signals before the applying each of the different median filters.

23. The method as set forth in claim 20 wherein the applying each of the different median filters further comprises replacing each individual pixel data signal within the set of pixel data signals with a median pixel data signal derived from a median value of adjacent pixel data signals within a set radius around the individual pixel data signal and wherein the applying further comprises applying a different filter to each of the sets of pixel data signals.

24. The method as set forth in claim 23 wherein the set radius is different for the different filters.

25. The method as set forth in claim 23 further comprising adjusting the set radius of pixel data signals in the filter for each of the channels of the digital image based on at least one factor.

26. The method as set forth in claim 25 wherein the factor comprises a duration of exposure for capturing the digital image.

27. An imaging system comprising:
an image sensor apparatus that captures a digital image comprising a plurality of channels with each of the channels comprising a set of pixel data signals;
a filter system comprising at least three different filters, each of the different filters filtering a different one of the sets of pixel data signals for one of the channels;
a filtering adjustment system that adjusts each of the different filters in the filter system based on at least exposure duration and one or more scene statistics for the provided digital image; and
a grayscale masking system with a grayscale mask for each of the sets of pixel data signals, each of the grayscale masks has one of a range of threshold values for an exposure condition for each of the pixel data signals that indicates when each of the pixel data signals should be filtered, wherein the filtering system applies the different filters to one or more of the pixel data signals in each of the sets of pixel data signals based on the threshold values for each of the pixel data signals provided by the grayscale mask.

28. The system as set forth in claim 27 further comprising a transformation system that applies a color-space transformation to the sets of pixel data signals before the filters filter the sets of pixel data.

29. The system as set forth in claim 27 wherein each of the different adjusted filters is a median filter and the median filters each replace each individual pixel data signal within the set of pixel data signals with a median pixel data signal derived from a median value of adjacent pixel data signals within a set radius around the individual pixel data signal.

30. The system as set forth in claim 29 wherein the set radius is different for the different filters.

31. The system as set forth in claim 29 wherein the set radius of pixel data signals in the filter for each of the channels of the digital image is adjustable.

32. An imaging system comprising:
an image sensor apparatus which captures a digital image comprising red, green, and blue channels;
a transformation system coupled to the image sensor apparatus which transforms the red, green, and blue channels to an achromatic channel and two chrominance channels, wherein the achromatic channel and the two chrominance channels each comprise a set of pixel data signals;
a filter system comprising at least two different filters, each of the filters filtering at least one of the transformed sets of pixel data signals for one of the achromatic or chrominance channels;
a filtering adjustment system that adjusts each of the filters to a different one of the sets of pixel data signals based on at least exposure duration and one or more scene statistics for the provided digital image; and
a grayscale masking system with a grayscale mask for each of the sets of pixel data signals, each of the grayscale masks has one of a range of threshold values for an exposure condition for each of the pixel data signals that indicates when each of the pixel data signals should be filtered, wherein the filtering system applies the filters to one or more of the pixel data signals in each of the sets of pixel data signals based on the threshold values for each of the pixel data signals provided by the grayscale mask.

33. The system as set forth in claim 32 wherein the filter system further comprises at least three different filters, each of the filters filtering a different one of the transformed sets of pixel data signals.

34. The system as set forth in claim 32 wherein each of the filters is a median filter and the median filters each replace each individual pixel data signal within the set of pixel data signals with a median pixel data signal derived from a median value of adjacent pixel data signals within a set radius around the individual pixel data signal.

35. The system as set forth in claim 34 wherein the set radius is different for the different filters.

36. The system as set forth in claim 34 wherein the set radius of pixel data signals in the filter for each of the channels of the digital image is adjustable.

37. An imaging system comprising:
an image sensor apparatus for capturing a digital image comprising a plurality of channels with each of the channels comprising a set of pixel data signals;
a grayscale masking system with a grayscale mask for each of the sets of pixel data signals, each of the grayscale masks has one of a range of threshold values for an exposure condition for each of the pixel data signals that indicates when each of the pixel data signals should be filtered
a filter system that applies a different median filter to each of the sets of pixel data signals, wherein the filtering system applies each of the different median filters to one or more of the pixel data signals in each of the sets of pixel data signals based on the threshold values for each of the pixel data signals provided by the grayscale mask; and
a filtering adjustment system that adjusts each of the different median filters based on at least exposure duration and one or more scene statistics for the provided digital image.

38. The system as set forth in claim 37 further comprising a transformation system coupled to the image sensor apparatus which transforms the red, green, and blue channels to an achromatic channel and two chrominance channels before the filter system applies the filters, wherein the achromatic channel and the two chrominance channels each comprise a set of pixel data signals.

39. The system as set forth in claim 37 wherein the masking system comprises a memory for storing the identified pixels for the image sensor apparatus.

40. The system as set forth in claim 37 wherein the filters each replace each individual pixel data signal within the set of pixel data signals with a median pixel data signal derived from a median value of adjacent pixel data signals within a set radius around the individual pixel data signal, wherein a different one of the filters is applied to each of the sets of pixel data signals.

41. The system as set forth in claim 40 wherein the set radius is different for the different filters.

42. The system as set forth in claim 40 wherein the set radius of pixel data signals in the filter for each of the channels of the digital image is adjustable.

* * * * *